(12) United States Patent
Ogawa et al.

(10) Patent No.: US 7,364,083 B2
(45) Date of Patent: Apr. 29, 2008

(54) IC CARD WITH BUILT-IN COPROCESSOR FOR AUXILIARY ARITHMETIC, AND CONTROL METHOD THEREOF

(75) Inventors: Ryuichi Ogawa, Ichihara (JP); Masaki Wakabayashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 483 days.

(21) Appl. No.: 11/048,867

(22) Filed: Feb. 3, 2005

(65) Prior Publication Data

US 2005/0167513 A1 Aug. 4, 2005

(30) Foreign Application Priority Data

Feb. 4, 2004 (JP) ............................. 2004-027573

(51) Int. Cl.
G06K 19/00 (2006.01)
G06K 19/06 (2006.01)
G06K 7/08 (2006.01)
G06K 7/00 (2006.01)

(52) U.S. Cl. ...................... 235/487; 492/435; 492/449; 492/451

(58) Field of Classification Search ................ 235/487, 235/492, 449, 451, 435
See application file for complete search history.

(56) References Cited

U.S. PATENT DOCUMENTS 5,129,091 A * 7/1992 Yorimoto et al. ........... 713/323
5,146,068 A * 9/1992 Ugawa et al. .............. 235/441
5,515,514 A * 5/1996 Dhuey et al. ............... 710/301
5,517,460 A * 5/1996 Yamaguchi ................. 365/233
5,666,537 A 9/1997 Debnath et al.
6,035,317 A * 3/2000 Guy .......................... 708/620
6,343,744 B1 * 2/2002 Shibata et al. .............. 235/492

(Continued)

FOREIGN PATENT DOCUMENTS

EP 0446519 A2 9/1991

(Continued)

OTHER PUBLICATIONS

ISO/IEC 14443-3, Final Committee Draft, Identification cards—Contactless integrated circuit(s) cards—Proximity cards—Part 3: Initialization and anticollision, Editor: D. Baddeley (Jun. 11, 1999).

(Continued)

*Primary Examiner*—Daniel Walsh
(74) *Attorney, Agent, or Firm*—Birch, Stewart, Kolasch & Birch, LLP

(57) ABSTRACT

An IC card according to the present invention comprises, a built-in coprocessor for an auxiliary arithmetic in addition to a main arithmetic processing unit, an interval timer for outputting an interrupt request signal upon lapse of a set time shorter than the frame waiting time, and coprocessor control means for controlling the coprocessor operation by suspending supply of an operation clock to the coprocessor in accordance with the output of the interrupt request signal and resuming supply of the operation clock to the coprocessor in accordance with a predetermined response input from an external device. Upon receipt of a command from the external device, the contents of the command are determined, and the time shorter than the frame waiting time is set in the interval timer thereby to start the interval timer.

12 Claims, 11 Drawing Sheets

U.S. PATENT DOCUMENTS

| | | | |
|---|---|---|---|
| 6,460,146 B1* | 10/2002 | Moberg et al. | 714/10 |
| 6,597,285 B2* | 7/2003 | Yamamoto et al. | 235/492 |
| 6,907,526 B2* | 6/2005 | Tanimoto et al. | 713/174 |
| 2001/0047480 A1* | 11/2001 | Tanimoto et al. | 713/190 |
| 2002/0018001 A1* | 2/2002 | Yamamoto et al. | 340/825.22 |
| 2002/0062330 A1* | 5/2002 | Paar et al. | 708/492 |
| 2002/0166075 A1 | 11/2002 | Agarwal et al. | |
| 2003/0006879 A1* | 1/2003 | Kang et al. | 340/5.61 |
| 2003/0024980 A1* | 2/2003 | Everett et al. | 235/380 |
| 2004/0015594 A1 | 1/2004 | Guterman et al. | |
| 2004/0039928 A1* | 2/2004 | Elbe et al. | 713/189 |
| 2004/0049460 A1* | 3/2004 | Doron et al. | 705/41 |
| 2004/0059916 A1* | 3/2004 | Mizushima et al. | 713/172 |
| 2004/0124250 A1* | 7/2004 | Kojima et al. | 235/492 |
| 2004/0139363 A1* | 7/2004 | Elbe et al. | 713/400 |
| 2005/0086553 A1* | 4/2005 | Spencer | 713/600 |
| 2005/0094463 A1* | 5/2005 | Nishizawa et al. | 365/222 |
| 2005/0161508 A1* | 7/2005 | Akaida et al. | 235/451 |
| 2005/0167513 A1* | 8/2005 | Ogawa et al. | 235/492 |
| 2006/0126830 A1* | 6/2006 | Shimizu | 380/28 |
| 2006/0183355 A1* | 8/2006 | Nishizawa et al. | 439/60 |

FOREIGN PATENT DOCUMENTS

| | | |
|---|---|---|
| EP | 1134693 A2 | 9/2001 |
| JP | 2002-222402 A | 8/2002 |
| JP | 2003-168092 A | 6/2003 |

OTHER PUBLICATIONS

Draft ISO/IEC FCD 14443-4, Identification cards—Contactless integrated circuit(s) cards—Proximity cards—Part 4: Transmission protocol, Editor: Hauke Meyn (Mar. 10, 2000).

ISO/IEC 7816-3, Identification cards—Integrated circuit(s) cards with contacts—Part 3: Electronic signals and transmission protocols (Sep. 15, 1989).

* cited by examiner

IC CARD WITH BUILT-IN COPROCESSOR FOR AUXILIARY ARITHMETIC, AND CONTROL METHOD THEREOF

CROSS REFERENCE TO RELATED APPLICATTION

This Nonprovisional application claims priority under 35 U.S.C. § 119(a) on Patent Application No. 2004-027573 filed in Japan on Feb. 4, 2004, the entire contents of which are hereby incorporated by reference.

BACKGROUND OF THE INVENTION

1. Field of the Invention

The present invention relates to an IC card with a built-in coprocessor for an auxiliary arithmetic such as cryptographic processing and, more specifically, to a technique, which is applicable to all IC cards of a non-contact type, a contact type and a combination type, for improving an efficiency of a communication protocol between an IC card and an external device.

2. Description of the Related Art

An IC card comprising a plastic card and an IC chip (semiconductor integrated circuit device) such as a nonvolatile memory, a CPU or a cryptographic coprocessor mounted thereon, as compared with a widely-used magnetic card, can handle a greater amount of data and is superior in security. Therefore, the use of the IC card has begun to extend in various applications. The IC card is classified into a contact type, a non-contact type or a combination type. The contact type IC card having metal terminals arranged on the surface thereof is inserted into an external reader/writer, so that power is supplied and the data is exchanged through the terminals. In the non-contact type IC card, an antenna coil is brought into a magnetic field generated by a reader/writer using an electromagnetic induction technique thereby to supply power or to exchange data with radio wave (carrier frequency of, for example, several to several tens of MHz). The combination type IC card has interfaces of both contact and non-contact types. In recent years, the non-contact type IC card has begun to be widely used for its operating convenience.

(Problem Regarding Power Supply of Non-Contact Type IC Card)

In non-contact communication using the non-contact type IC card or the combination type IC card, power is supplied to the IC card from a reader/writer by electromagnetic induction. Therefore, the IC card cannot be driven with a large capacity of power and has only a small capacity of power supply. In the non-contact type IC card, therefore, power consumption is required to be minimized. The currently available IC card consumes a considerable amount of current for reading, writing or erasing the data in the nonvolatile memory or by a coprocessor for cryptographic operation described above, and therefore the problem is posed how to supply power in a non-contact manner.

(Problem Regarding Communication in Non-Contact IC Card)

The communication method of the proximity non-contact type IC card is standardized by ISO 14443 type B (ASK 10%), for example, and uses the low-depth modulation. The low-depth modulation is defined as a communication with a low modulation rate of, e.g., 10%, the modulation rate being defined by the following expression (1) with respect to the maximum width Amax and the minimum width Amin of a signal used for the communication.

$$\text{Modulation rate}=(A_{max}-A_{min})/(A_{max}+A_{min}) \quad (1)$$

In the low-depth modulation, a slight voltage change affects the communication quality. During communication, therefore, it is indispensable to suppress the current consumption as far as possible. Because of this restriction, the arithmetic operation of the coprocessor and the writing, erasing or reading operations of the nonvolatile memory are conventionally difficult to perform during communication.

(Problem Regarding Setting of Frame Waiting Time)

An initial response in communication between the non-contact type IC card and the reader/writer is standardized by ISO 14443-3. A processing flowchart of the non-contact type IC card is shown in FIG. 1.

A protocol for communication between the non-contact type IC card and the reader/writer after initial response is also standardized by ISO 14443-4.

The initial response is started by the fact that the power supply of the non-contact type IC card is turned on by the energy from the reader/writer and a REQB command is sent from the reader/writer to the IC card. The REQB command is to request the non-contact type IC card to make preparation and contains an application field identifier (AFI), an attribute information parameter (PARM) and a circuit redundancy check code (CRC).

The non-contact type IC card that has received the REQB command detects the coincidence of the application field identifier (AFI) in the REQB command, determines the upper limit of the number N (N=1 in this embodiment) of the non-contact type IC cards from the attribute information (PARM) and, then, returns an ATQB response to the reader/writer. The ATQB response is a request response signal to the REQB command and contains information such as a pseudo unique identifier (PUPI), application information (application data), protocol information and a circuit redundancy check code (CRC). By receiving the ATQB response, the reader/writer acquires the information.

Once the non-contact type IC card returns the ATQB response, receives an ATTRIB command and returns an ATTRIB response, then the initial response is completed and the non-contact type IC card proceeds to an active mode.

After that, communication is carried out between the non-contact type IC card and the reader/writer with the protocol standardized by ISO 14443-4.

Normally, the reader/writer transmits a command to the non-contact type IC card using the protocol described above. The non-contact type IC card executes the process corresponding to the received command and transmits the result of executing the command to the reader/writer. The non-contact type IC card, upon receipt of a DESELECT command by the S block from the reader/writer, proceeds to the halt mode. As long as the non-contact type IC card is in halt mode, only the WUPB command can be received from the reader/writer. The WUPB command permits the non-contact type IC card to perform the operation from and including the detection of AFI coincidence again of all the initial response operations.

The protocol information contained in the ATQB response to the REQB command at the time of initial response includes the parameters required by the non-contact type IC card for communication such as the bit transmission rate and the maximum frame size, which in turn includes the parameter FWI used by the reader/writer to set the frame waiting time. The reader/writer, after receipt of FWI, executes the calculation of the following expression (2) and sets the frame waiting time FWT.

$$FWT=(256\times16/fc)\times2^{FWI} \quad (2)$$

In the above expression (2), fc is the carrier frequency generated by the reader/writer and standardized as 13.56 MHz. According to the ISO standard, FWI is assigned the value of 0 to 14 (corresponding to FWT of about 302 μs to about 4949 ms). The specific value of FWI to be employed is determined by the non-contact type IC card. Therefore, the non-contact type IC card is required to complete the internal process thereof within the time corresponding to the FWI transmitted to the reader/writer. In the case where the non-contact type IC card fails to complete the internal process within the particular time, the reader/writer is permitted to handle the process as a time-out error. During the protocol communication according to ISO 14443-4, assume that the non-contact type IC card fails to complete the process within the frame waiting time of the reader/writer. The non-contact type IC card is required to request the reader/writer to extend the frame waiting time and extend the time-out error determination time of the reader/writer. The communication command between the reader/writer and the non-contact type IC card for extension of the frame waiting time is specified by the protocol standard of ISO 14443-4. Currently, the long internal process required of the non-contact type IC card includes the arithmetic for various encryption/decryption requiring the coprocessor arithmetic.

In the case where FWI is set to a value as large as 14 in the initial response, for example, long time-out determination time is always set in the reader/writer. Under such a condition, a fault occurs in the internal process or communication of the non-contact type IC card for other commands requiring no time extension, and the reader/writer cannot correctly receive the response of the non-contact type IC card to the command from the reader/writer. Then, the reader/writer undesirably would consume more time than necessary to determine the fault of time-out error, resulting in a deteriorated performance. Therefore, the FWI for the initial response is desirably set to as small a value as possible taking the overall performance of the IC card system into consideration.

In the case where the FWI is set to a value as small as 4, for example, taking the performance of the IC card system into consideration, however, the coprocessor arithmetic may require the arithmetic time longer than the frame waiting time of the reader/writer.

To cope with this problem of setting the frame waiting time, a method might be conceived in which communication is established between the reader/writer and the non-contact type IC card for extending the frame waiting time utilizing the timer interrupt or the like during the coprocessor arithmetic. The request (communication) issued for extending the frame waiting time during the arithmetic of the coprocessor, however, adds the communication process to the original arithmetic process and increases the power consumption. As a result, the communication distance of the non-contact type IC card is shortened or the communication stability is reduced. Therefore, it is difficult to improve the efficiency by this method.

Also, the processing time of the coprocessor arithmetic varies with the type of arithmetic executed by the arithmetic coprocessor and the parameter applied to the arithmetic coprocessor. Currently, a plurality of cryptographic processes or a plurality of parameter processes even for a single cryptographic process are required, and it is difficult to predict the need to extend the frame waiting time by tabling the processing time in advance. As far as the non-contact type IC card currently used is concerned, therefore, the communication is carried out to extend the frame waiting time and the extension of the frame waiting time is set in the reader/writer before executing all the coprocessor arithmetic. Setting the frame waiting time in the reader/writer is a temporary process, and the frame waiting time of the reader/writer is restored to the initial value upon completion of one command process of the non-contact type IC card (upon transmission of the response to the command to the reader/writer).

An example of the conventional method of setting the frame waiting time is shown in FIG. 2. According to the conventional method shown in FIG. 2, the reader/writer and the non-contact type IC card operate as described below in accordance with the ISO 14443-4 protocol. In FIG. 2, R/W designates the reader/writer and ICC the non-contact type IC card.

(1) The reader/writer transmits a command to the non-contact type IC card by the I block. The non-contact type IC card receives the command and determines the type of the command.

(2) In the case where the command received in (1) requires the operation of the arithmetic coprocessor, the non-contact type IC card transmits a frame waiting time extension request (WTX request of S block) to the reader/writer before starting the arithmetic of the coprocessor.

(3) In accordance with the WTX request of the S block, the reader/writer extends the frame waiting time. The reader/writer thus sends a frame waiting time extension response (WTX response of S block) to the non-contact type IC card.

(4) The non-contact type IC card executes the command (arithmetic process of the coprocessor).

(5) The non-contact type IC card, upon complete execution of the command, sends the result of command execution to the reader/writer by the I block.

The conventional method of setting the frame waiting time described above, however, has at least two problems. Firstly, the communication to extend the frame waiting time even for the coprocessor arithmetic not requiring the extension of the frame waiting time (short in processing time) is carried out. Therefore, the waste of time is caused by the additional transmitting and receiving operation, thereby deteriorating the efficiency of communication between the reader/writer and the non-contact type IC card. Secondly, the communication required for frame waiting time extension before the coprocessor arithmetic undesirably provides a trigger to notify the offender of the analysis points such as key information on the encrypting and decrypting operation, often leading to a security problem.

SUMMARY OF THE INVENTION

The present invention has been developed to obviate the aforementioned problems, and the object thereof is to provide an IC card capable of high-efficiency communication with small power consumption and a control method which mainly obviates the problem of power supplied to the non-contact type IC card, the communication problem and the problem of setting the frame waiting time.

In order to achieve the object described above, according to a first aspect of the invention, there is provided an IC card with a built-in coprocessor for an auxiliary arithmetic in addition to a main arithmetic processing unit, comprising an interval timer for outputting an interrupt request signal upon lapse of a set time shorter than a frame waiting time; and coprocessor control means for controlling the operation of the coprocessor by suspending the supply of an operation clock to the coprocessor in accordance with an output of the interrupt request signal, and resuming the supply of the operation clock in accordance with a predetermined response input from an external device.

In the IC card according to the first aspect of the invention, assume that the arithmetic process of the coprocessor exceeds a set time shorter than the frame waiting time. Then, the arithmetic process of the coprocessor is suspended, and a request for changing the communication conditions (for example, a frame waiting time extension request) is sent to an external device such as a reader/writer to change the communication conditions of the external device. Upon receipt of the input of a response confirming the change, the suspended arithmetic process of the coprocessor can be resumed. As a result, the power supply problem of the non-contact type IC card and the communication problem are avoided which otherwise might be caused by the simultaneous execution of the arithmetic process of the coprocessor operation and the communication with the external device. Thus, a frame waiting time extension request can be issued to the external device during the arithmetic process of the coprocessor, and an undue occurrence of a time-out error is avoided. Also, in the case where the arithmetic process of the coprocessor is completed before the lapse of the set time, the wasteful request for changing the communication conditions to the external device is saved for an improved communication and processing efficiency. Further, in view of the fact that the request for changing the communication conditions is issued to the external device upon the lapse of the set time after starting the arithmetic process of the coprocessor, security is improved against the offender attempting to use the communication as a trigger.

According to a second aspect of the present invention, there is provided an IC card in the first aspect of the present invention, preferably further comprising interval timer setting means for determining, upon receipt of a command from the external device, the contents of the command and setting the set time shorter than the frame waiting time in the interval timer thereby to start the interval timer. The process of the interval timer setting means is preferably executed by the arithmetic processing unit. In this second aspect of the invention, the set time in the interval timer can be adjusted in accordance with the contents of the command received from the external device, and therefore the communication efficiency and the processing efficiency are effectively improved.

According to a third aspect of the present invention, there is provided an IC card in any of the aspects described above, wherein the coprocessor control means preferably includes a control flag for controlling the suspension and resumption of the supply of the operation clock to the coprocessor; operation clock control means for controlling the suspension and resumption of the supply of the operation clock to the coprocessor in accordance with the state of the control flag; and control flag setting means for setting the control flag to the suspension mode upon receipt of the output of the interrupt request signal and setting the control flag to the resumption mode upon receipt of the response input. In this aspect of the present invention, the process of the control flag setting means is preferably executed by the arithmetic processing unit. This third aspect of the present invention specifically implements the coprocessor control means and produces the operational effects of the IC card according to the first or second aspect of the present invention.

According to a fourth aspect of the present invention, there is provided an IC card in the third aspect described above, wherein the arithmetic processing unit outputs a frame waiting time extension request to the external device upon suspension of the supply of the operation clock to the coprocessor, and sets the control flag to the resumption mode upon receipt of the response input from the external device. The process of the control flag setting means is executed by the arithmetic processing unit. In this fourth aspect of the present invention, communication is carried out with the external device to issue the frame waiting time extension request during the suspension of the arithmetic process of the coprocessor. Therefore, the frame waiting time can be extended while avoiding the shortage of power supply, thereby producing the operational effects of the IC card according to the first or second aspect of the present invention described above.

According to a fifth aspect of the present invention, there is provided an IC card in any of the aspects described above further comprising a nonvolatile memory for storing a program for normal processing, and a second memory lower in power consumption than the nonvolatile memory, wherein the program executed by the coprocessor is stored in the second memory at least when the coprocessor is in operation. Further, the access to the nonvolatile memory is preferably prohibited during the operation of the coprocessor. In this fifth aspect of the present invention, the power consumed for the arithmetic process of the coprocessor is reduced, and especially, the power supply problem of the non-contact type IC card is more effectively obviated.

Preferably, the IC card according to any of the aspects described above further comprises at least one of a non-contact interface and a contact interface for communication with the external device. In this way, the operational effects of the IC card according to each aspect of the present invention described above can be produced without regard to whether the communication interface is of contact or non-contact type.

In order to achieve the object described above, according to the present invention, there is also provided a control method of an IC card with a built-in coprocessor for an auxiliary operation in addition to a main arithmetic processing unit, the method comprising: setting an interrupt permission so as to output an interrupt request signal upon lapse of a set time shorter than a frame waiting time; starting the arithmetic of the coprocessor after setting the interrupt permission; branching the operation to an interrupt process in response to the output of the interrupt request signal during the arithmetic of the coprocessor; and suspending the supply of an operation clock to the coprocessor and resuming the supply of the operation clock to the coprocessor upon receipt of a predetermined response input from the external device in the interrupt process.

The control method according to above described aspect of the present invention preferably further comprises: determining upon receipt of a command from the external device, whether the command is an execution command of the coprocessor, and setting the interrupt permission when the command is an execution command of the coprocessor. Further, the control method preferably comprises: in the interrupt process, outputting a frame waiting time extension request to the external device after suspending the supply of the operation clock to the coprocessor, and resuming the supply of the operation clock upon receipt of a response input from the external device.

DESCRIPTION OF PREFERRED EMBODIMENTS

An IC card according to an embodiment of the present invention is explained below with reference to the drawings.

First Embodiment

Figure 3:
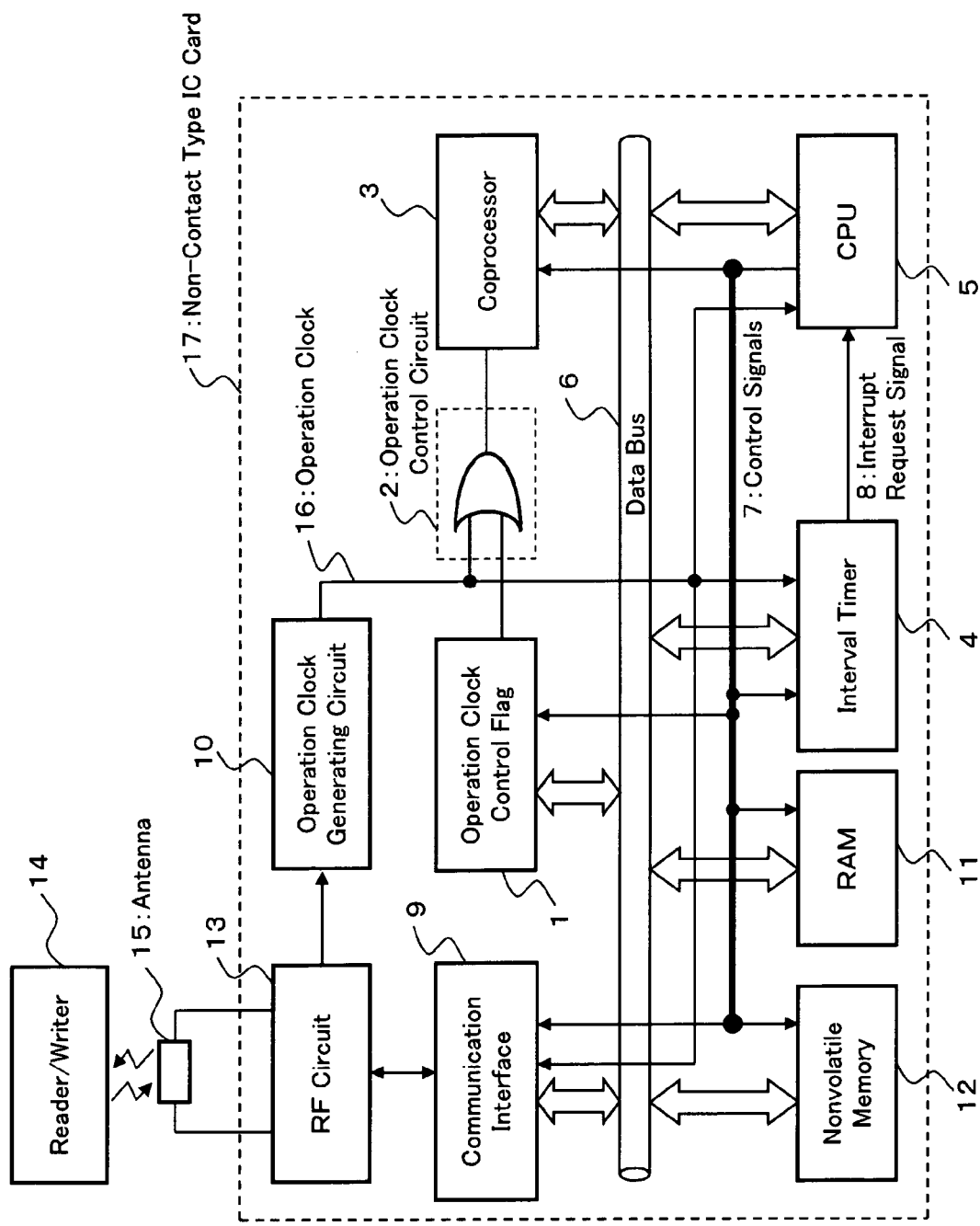
FIG. 3 is a diagram showing a system configuration as an example of a hardware configuration of an IC card according to the present invention.

First, the hardware configuration of the IC card according to the present invention is explained with reference to the system configuration shown in FIG. 3. The first embodiment assumes a non-contact type IC card.

A non-contact type IC card 17 according to the present invention comprises a CPU 5 constituting a main arithmetic processing unit and a built-in coprocessor 3 for the auxiliary operation such as the cryptographic operation in addition to the CPU 5. The non-contact type IC card 17 further comprises an operation clock control flag 1 for suspending and resuming the supply of the coprocessor operation clock to the coprocessor 3, an operation clock control circuit 2 for controlling the operation of suspending and resuming the supply of the operation clock to the coprocessor 3, and an interval timer 4. The non-contact type IC card 17 also comprises an antenna 15 for transmitting/receiving the signal generated from a reader/writer 14 constituting an external device, an RF circuit 13 connected to the antenna 15, a communication interface 9 connected to the RF circuit 13, and an operation clock generating circuit 10 connected to the RF circuit 13. Furthermore, the non-contact type IC card 17 comprises a nonvolatile memory 12 such as a flash memory and a RAM 11 such as a static RAM for storing the control program to control the IC card having the above-mentioned configuration through the process executed by the CPU 5.

The RF circuit 13 demodulates the signal received from the reader/writer 14 and transmits the data to the communication interface 9. The RF circuit 13 also transmits the data from the communication interface 9 to the reader/writer 14 through the antenna 15. Further, the RF circuit 13 extracts the clock from the signal received from the reader/writer 14 and supplies the clock to the operation clock generating circuit 10.

In the operation clock generating circuit 10, the operation clock 16 for activating various circuits in the non-contact type IC card 17 is generated and supplied to the operation clock control circuit 2, the CPU 5, the interval timer 4, the communication interface 9 and the like.

The operation clock control flag 1, the coprocessor 3, the interval timer 4, the CPU 5, the communication interface 9, the nonvolatile memory 12 and the RAM 11 are connected to each other through a data bus 6. The control signals 7 output from the CPU 5 are input to the operation clock control flag 1, the coprocessor 3, the interval timer 4, the communication interface 9, the nonvolatile memory 12 and the RAM 11. The control signals 7 include, for example, an address signal, a readout signal and a write signal and the like. Also, the interrupt request signal 8 output from the interval timer 4 is input to the CPU 5.

The operations of the operation clock control flag 1, the coprocessor 3, the interval timer 4, the communication interface 9, the nonvolatile memory 12 and the RAM 11 can be controlled by the CPU 5 by executing the control program using the data bus 6 and the control signals 7. For example, the CPU 5 can cause the interval timer 4 to perform an arbitrary counting operation by writing an arbitrary data to the interval timer 4 using the control signals 7 including an arbitrary address signal and a write signal through the data bus 6. The interval timer 4 started by the CPU 5 outputs the interrupt request signal 8 to the CPU 5 upon lapse of a designated set time, and the CPU 5 executes the interrupt process and recognizes the lapse of the frame waiting time by receiving the interrupt request signal 8. The program for the interrupt process is stored in the nonvolatile memory 12 or the RAM 11. This interrupt process includes the process of transmitting and receiving the frame waiting time extension signal to and from the reader/writer 14 using the communication interface 9.

Also, the CPU 5 can write the data "0" or "1" in the operation clock control flag 1 through the data bus 6 by the control signals 7 including an arbitrary address signal and a write signal. The CPU 5 also can read out the contents of the operation clock control flag 1 through the data bus 6 by the control signals 7 including an arbitrary address signal and a read signal.

Further, the CPU 5 can cause the coprocessor 3 to perform an arbitrary arithmetic by writing an arbitrary data to coprocessor 3 by the control signals 7 including an arbitrary address signal and a write signal through the data bus 6. The coprocessor 3 can be operated only when the operation clock 16 is supplied from the operation clock generating circuit 10, and suspends the arithmetic process while the operation clock 16 is not supplied from the operation clock generating circuit 10.

The operation clock 16 generated by the operation clock generating circuit 10 and the state of the operation clock control flag 1 are input to the operation clock control circuit 2 for controlling the suspension and resumption of the supply of the operation clock of the coprocessor 3. The operation clock control circuit 2 is configured of, for example, an OR circuit to control whether the operation clock is supplied or not to the coprocessor 3. In the case where the data on the operation clock control flag 1 is "0", the operation clock control circuit 2 supplies the operation clock 16 supplied from the operation clock generating circuit 10 to the coprocessor 3. In the case where the data on the operation clock control flag 1 is "1", on the other hand, the operation clock control circuit 2 doesn't supply the operation clock 16 supplied from the operation clock generating circuit 10 to the coprocessor 3.

The hardware configuration described above includes coprocessor control means for controlling the operation of the coprocessor 3 in such a manner that the supply of the operation clock to the coprocessor 3 is suspended in response to the output of the interrupt request signal 8 from the interval timer 4 and resumed in response to a predetermined response input from the external device, by the operation clock control flag 1, the operation clock control circuit 2 and the CPU 5 for setting data "0" or "1" in the operation clock control flag 1.

In the hardware configuration described above, the CPU 5 can control the suspension and resumption of the operation of the coprocessor 3 by controlling the operation clock control flag 1.

Next, a series of control steps executed for frame waiting time extension between the non-contact type IC card 17 and the reader/writer 14 using the hardware configuration described above is explained with reference to FIGS. 3, 4, 5. The communication protocol between the non-contact type IC card 17 and the reader/writer 14 is based on ISO 14443-3 and ISO 14443-4.

The control means for frame waiting time extension is stored in the nonvolatile memory 12 as a control program executed by the CPU 5. The control means is processed in software fashion using the peripheral hardware by the CPU 5.

Figure 4:
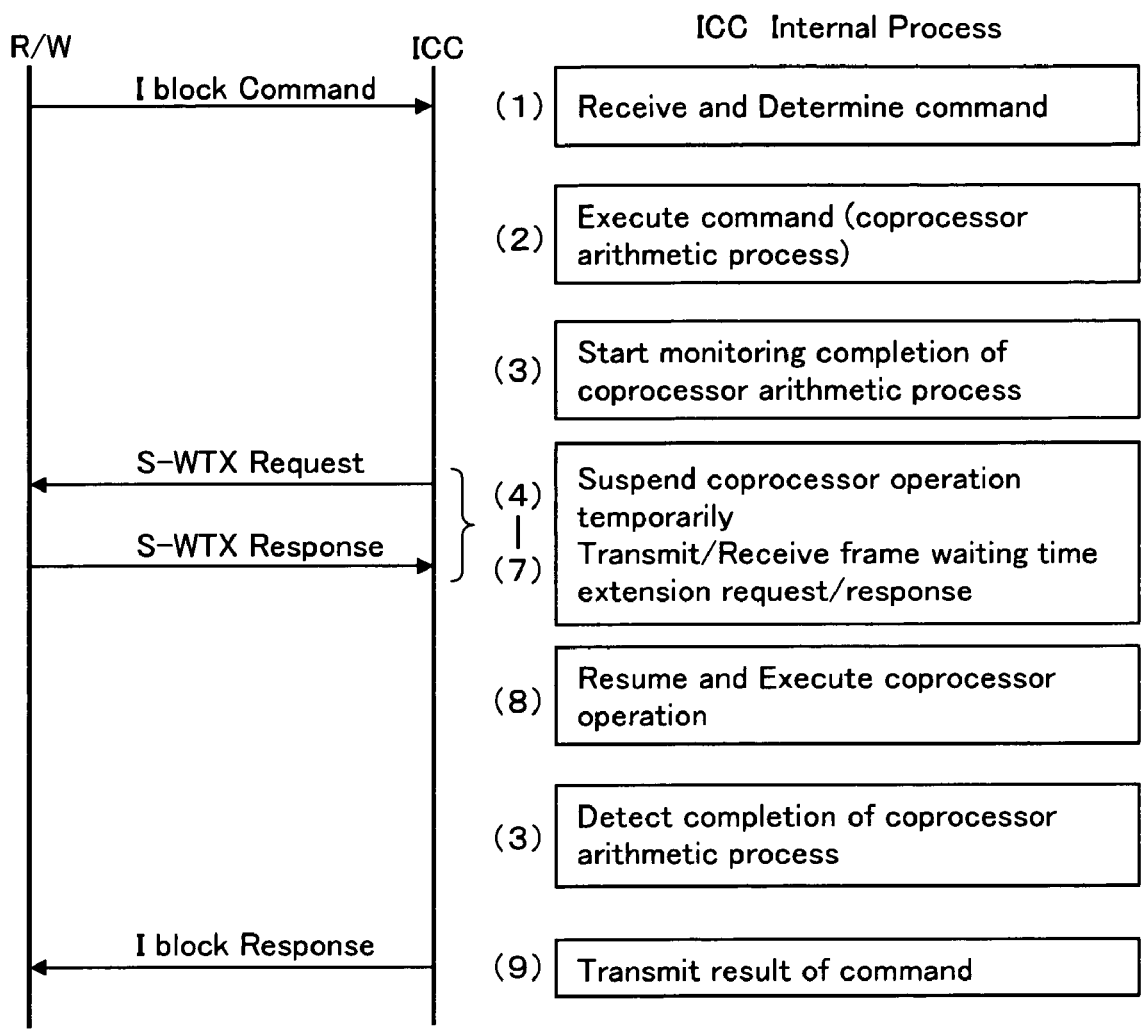
FIG. 4 is a diagram for explaining processing steps executed in the case where a frame waiting time is extended upon occurrence of a frame waiting time extension interrupt in the IC card according to the present invention.

FIG. 4 shows an example of the operation performed in the case where the S-WTX request is transmitted and received due to the overflow of the interval timer 4 used as a frame waiting time extension timer during the command execution (arithmetic process of the coprocessor 3) of the non-contact type IC card 17. In this case, the following processes (1) to (9) are executed.

Figure 5:
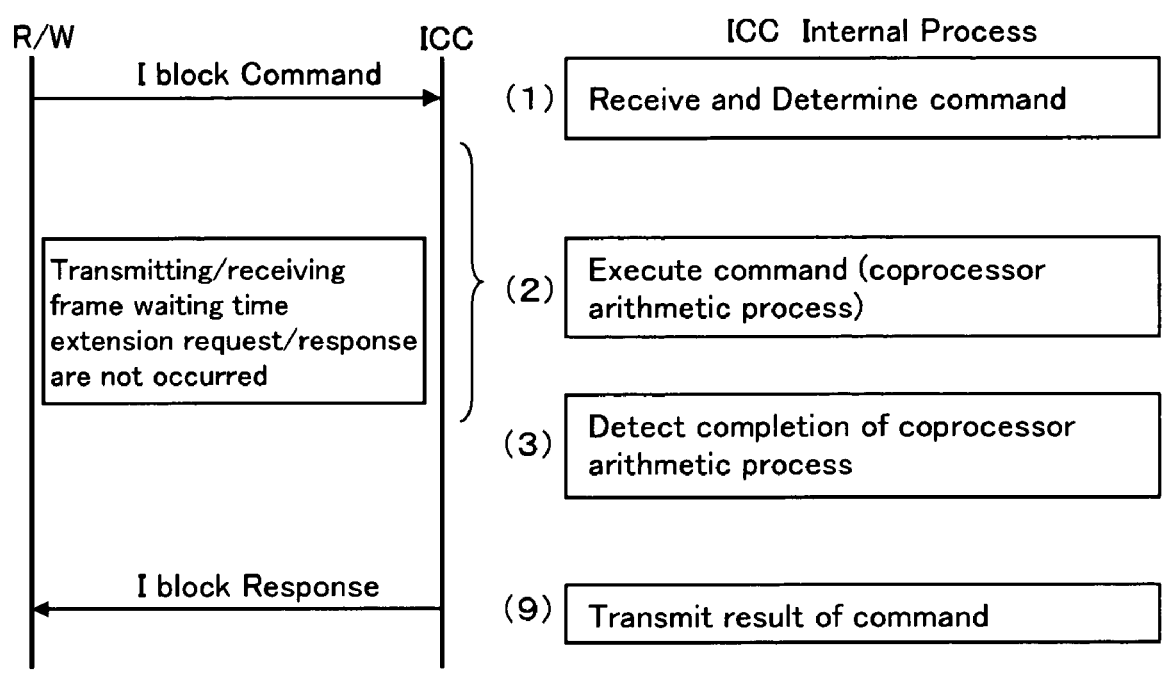
FIG. 5 is a diagram for explaining processing steps executed in the case where the frame waiting time is not extended in the absence of a frame waiting time extension interrupt in the IC card according to the present invention.

FIG. 5 shows an example of the operation performed in the case where the S-WTX request is not transmitted nor received due to the lack of overflow of the interval timer 4 used as a frame waiting time extension timer during the command execution (arithmetic process of the coprocessor 3) of the non-contact type IC card 17. In this case, the following processes (1) to (3) and (9) are executed.

This embodiment is so configured that the operation of the coprocessor 3 and the communication between the reader/writer 14 and the non-contact type IC card 17 are not performed at the same time.

Process (1): The reader/writer 14 transmits an arbitrary command to the IC card by the I block. The CPU 5 built in the non-contact type IC card 17 receives the command and determines the contents thereof. The CPU 5, after setting the count value for generating a timer interrupt before lapse of the frame waiting time, permits the timer interrupt and starts the interval timer 4 for frame waiting time extension.

Process (2): The CPU 5 executes the command (arithmetic process of the coprocessor).

Process (3): The CPU 5 monitors the end of the arithmetic process of the coprocessor 3 and upon detection of the end of the arithmetic process, executes the following process (9).

Process (4): In the case where the frame waiting time extension interval timer 4 overflows before detection of the end of the arithmetic process during the process (3), the interrupt request signal 8 is generated so that the process branches to the interrupt start routine of the non-contact type IC card 17, and the processes (5) to (8) are executed.

Process (5): The CPU 5 sets the data "1" in the operation clock control flag 1 and causes the operation clock control circuit 2 to suspend the supply of the operation clock 16 to the coprocessor 3. As a result, the operation of the coprocessor 3 is suspended.

Process (6): The CPU 5 calls the S-WTX request transmitting/receiving process. In the process, the CPU 5 transmits the frame waiting time extension request (S-WTX request) to the reader/writer 14. The S-WTX request is to request the extension of the frame waiting time by the command of the S block (control block under ISO 14443-4 protocol).

Process (7): The reader/writer 14 extends the time-out time in accordance with the S-WTX request. The reader/writer 14 transmits the frame waiting time extension response (S-WTX response) to the non-contact type IC card 17. The S-WTX response is given from the reader/writer 14 by the S-block command as a response to the S-WTX request.

Process (8): The CPU 5 sets the data "0" in the operation clock control flag 1, and causes the operation clock control circuit 2 to resume the supply of the operation clock 16 to the coprocessor 3. As a result, the operation of the coprocessor 3 is resumed. The non-contact type IC card 17 returns from the interrupt to the process (3).

Process (9): The CPU 5, upon complete execution of the command, transmits the command execution result to the reader/writer 14 by the I block (information block under ISO 14443-4 protocol).

The control processes described above start the interrupt process by the CPU 5 only in the case where the interrupt request signal 8 is generated by the interval timer 4 during the arithmetic process of the coprocessor 3. In such a case, the operation (arithmetic process) of the coprocessor 3 is temporarily suspended, and after extending the frame waiting time for the reader/writer 14, the operation of the coprocessor 3 can be resumed. Thus, the frame waiting time can be transmitted and received advantageously in terms of security without being noticed as a trigger by an offender to know the analysis points. In the case where the arithmetic of the coprocessor 3 is completed before occurrence of the interrupt request from the interval timer 4, on the other hand, the command can be completely processed before generation of the communication for frame waiting time extension, and therefore the communication efficiency can improved.

Second Embodiment

The first embodiment described above represents a case in which the communication between the reader/writer 14 and the non-contact type IC card 17 is not conducted simultaneously with the operation of the coprocessor 3. The first embodiment also illustrates a case in which the program executed by the coprocessor 3 is stored in the nonvolatile memory 12. The operation of the coprocessor 3 can be performed with lower power consumption on the RAM 11 rather than on the nonvolatile memory 12. The power consumption in the operation of the coprocessor 3 can be reduced therefore, by performing interrupt operation on the RAM 11 until the operation of the coprocessor 3 is suspended while prohibiting the access to the nonvolatile memory 12.

Also, the power consumption can be reduced by executing the program for the communication between the reader/writer 14 and the non-contact type IC card 17 at the time of frame waiting time extension on the RAM 11.

According to the second embodiment, the coprocessor processing program and the communication processing program between the reader/writer 14 and the non-contact type IC card 17 occurred at the time of frame waiting time extension are executed on the RAM 11, and the access to the nonvolatile memory 12 is prohibited during the execution of the coprocessor processing program. This embodiment is specifically explained with reference to the hardware configuration shown in FIG. 3 and the flowcharts shown in FIGS. 6 to 10. The hardware configuration of the non-contact type IC card 17 is assumed to be the same as that according to the first embodiment. Also, the control means of the non-contact type IC card 17 is stored in the nonvolatile memory 12 as a control program executed by the CPU 5.

Figure 6:
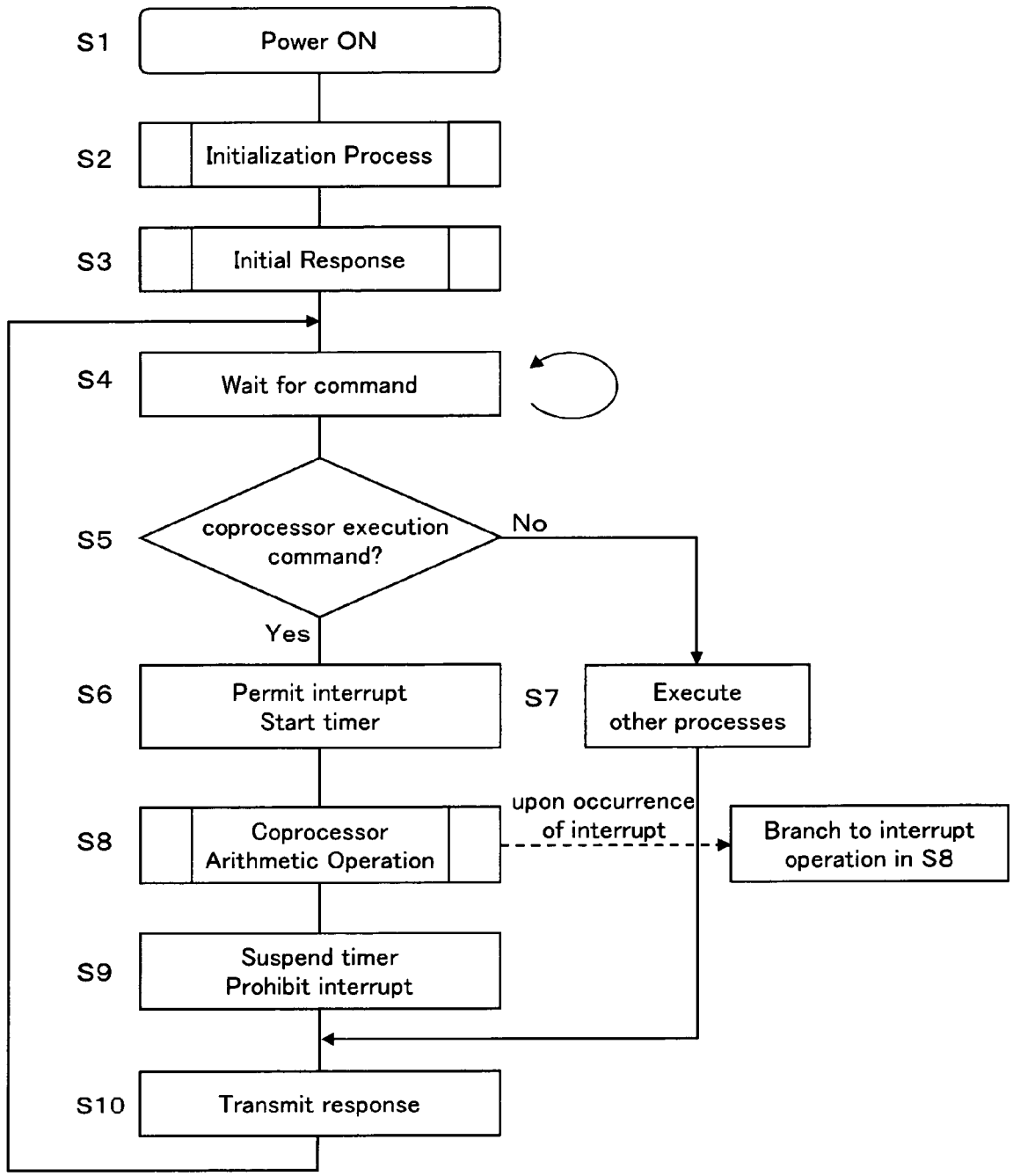
FIG. 6 is a flowchart showing an example of processing steps for controlling the IC card according to the present invention.

First, as shown in FIG. 6, power begins to be supplied to the non-contact type IC card 17 by the radio wave from the reader/writer 14. Then, the operation of the non-contact type IC card 17 starts (step S1).

Figure 7:
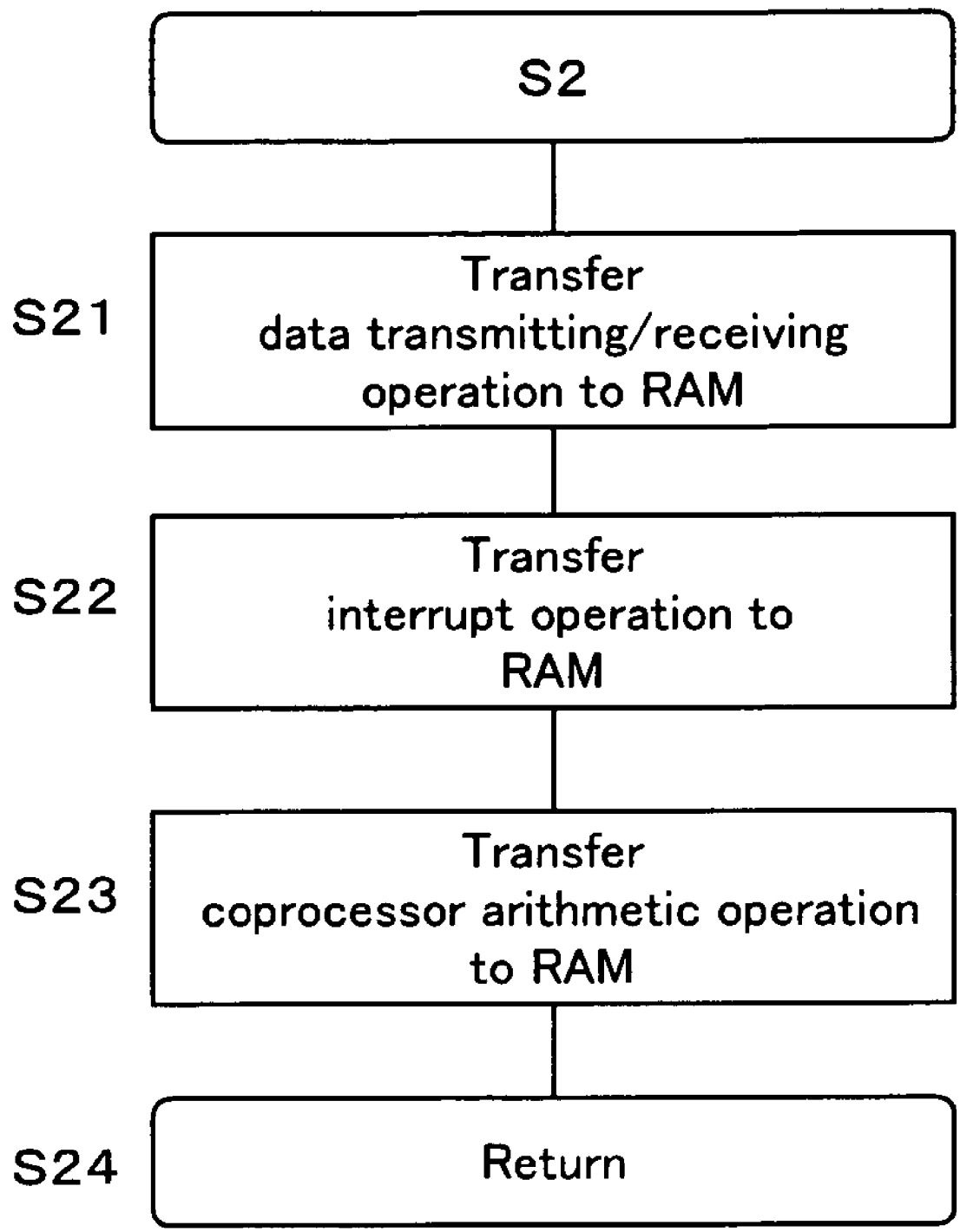
FIG. 7 is a flowchart showing a subroutine for an initialization process (step S2) in the flowchart shown in FIG. 6.

Next, the non-contact type IC card 17 executes the initialization process (step S2). The initialization process of step S2 is configured, as shown in FIG. 7, as an initialization process subroutine, for example. During this process, the program for each of the data transmitting/receiving process (step S21), the interrupt process (step S22) and the coprocessor arithmetic process (step S23) is transferred from the nonvolatile memory 12 to the RAM 11.

Figure 1:
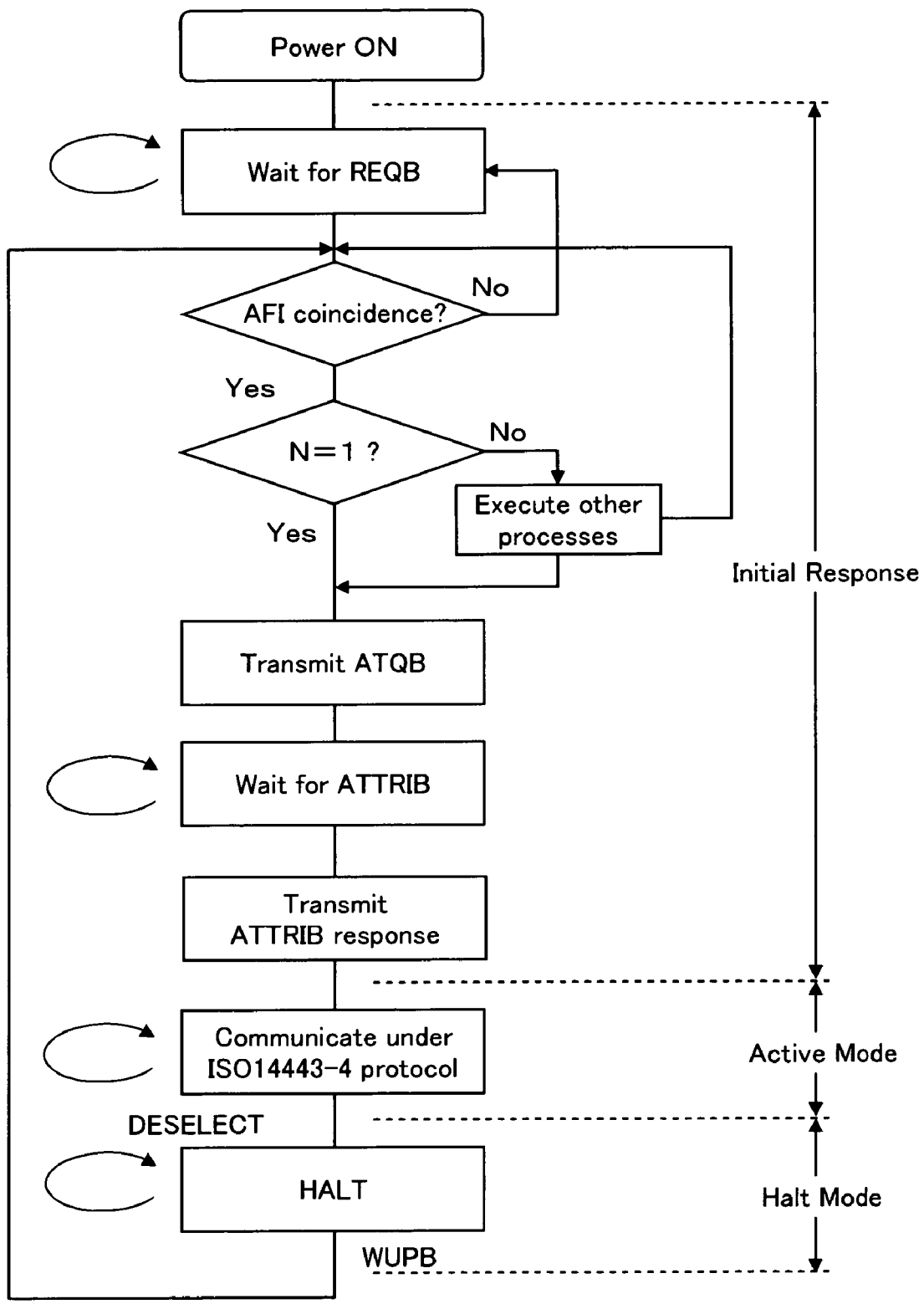
FIG. 1 is a flowchart showing an example of initial response at the time of non-contact operation of a non-contact type IC card or a combination type IC card specified in ISO 14443.
Figure 2:
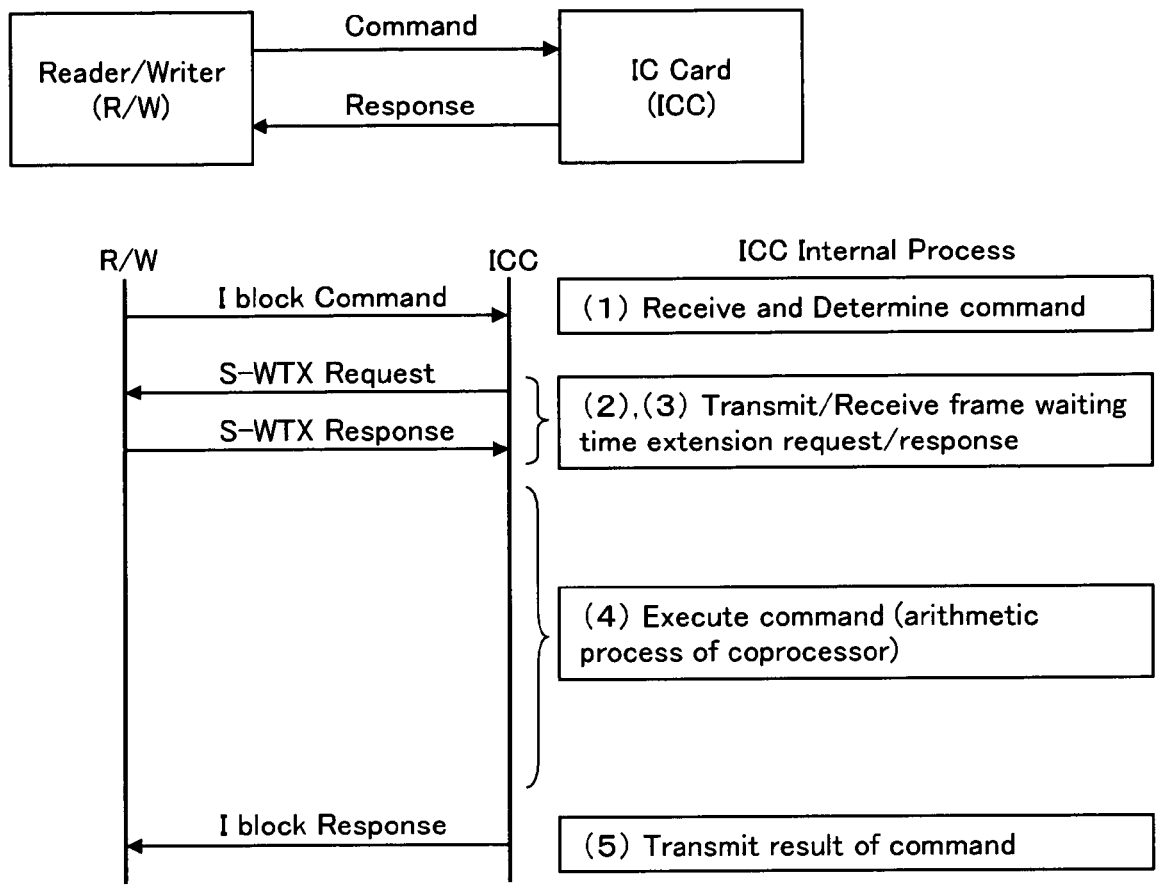
FIG. 2 is a diagram for explaining processing steps for extending a frame waiting time before coprocessor operation in a conventional IC card.

In step S3, the initial response operation shown in FIG. 1 is carried out between the non-contact type IC card 17 and the reader/writer 14, so that the non-contact type IC card 17 comes in a state (active state) communicable under ISO 14443-4 protocol.

The non-contact type IC card 17 branches, in step S4, to the process of receiving the data transferred to the RAM 11 in step S2 and waits for a command (I-block command) transmitted from the reader/writer 14.

The non-contact type IC card 17, upon receipt of the command (I-block command) from the reader/writer 14 in step S4, proceeds to step S5 and determines whether the command requires the execution of the coprocessor 3 or not. In the case where it is determined that the received command requires the execution of the coprocessor 3, the non-contact type IC card 17 proceeds to step S6. In step S6, the count value for generating the timer interrupt before lapse of the frame waiting time is set in the interval timer 4, and then the timer interrupt is permitted thereby to start the interval timer 4. In the case where it is determined that the received command requires no execution of the coprocessor 3, on the other hand, the non-contact type IC card 17 proceeds to step S7 where other processes are executed.

After starting the interval timer 4 in step S6, the non-contact type IC card 17 branches to the coprocessor arithmetic operation (step S8) stored in the RAM 11 in step S2.

Figure 8:
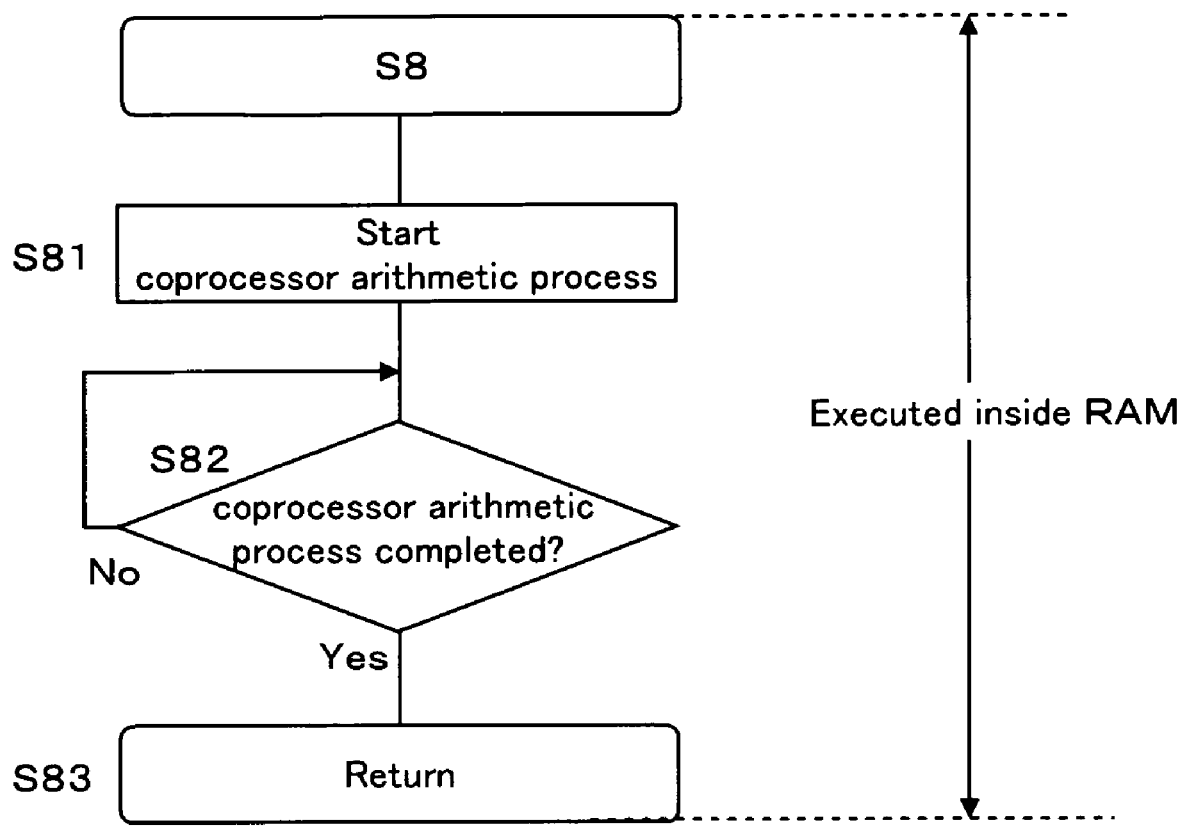
FIG. 8 is a flowchart showing a subroutine for a coprocessor operation (step S8) in the flowchart shown in FIG. 6.

After branching to step S8, as shown in FIG. 8, the non-contact type IC card 17 starts the coprocessor arithmetic from inside the RAM 11 (step S81), and waits for the end of the arithmetic process of the coprocessor 3 in step S82. In the case where the interval timer 4 overflows in step S82, the interrupt request signal 8 is generated to start the interrupt process. Once the interrupt process starts, the non-contact type IC card 17 branches to the interrupt process of step S8 stored in the RAM 11 in step S2. In the case where the arithmetic process of the coprocessor 3 ends without overflow of the interval timer 4 in step S82, on the other hand, the non-contact type IC card 17 completes the arithmetic process of the coprocessor 3 in step S8.

Figure 9:
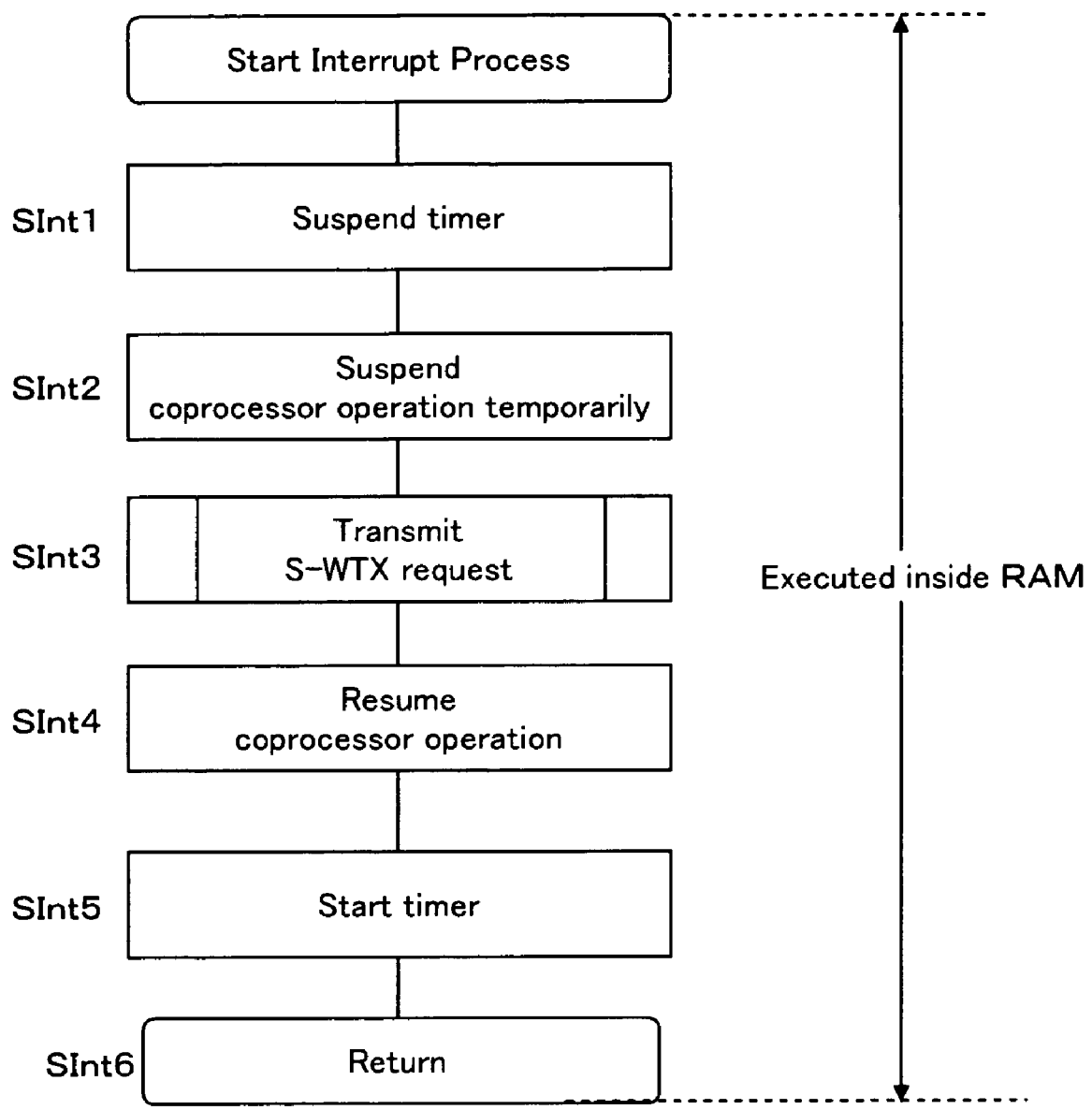
FIG. 9 is a flowchart showing a subroutine for an interrupt process in step 8 of the flowchart shown in FIG. 6.
Figure 10:
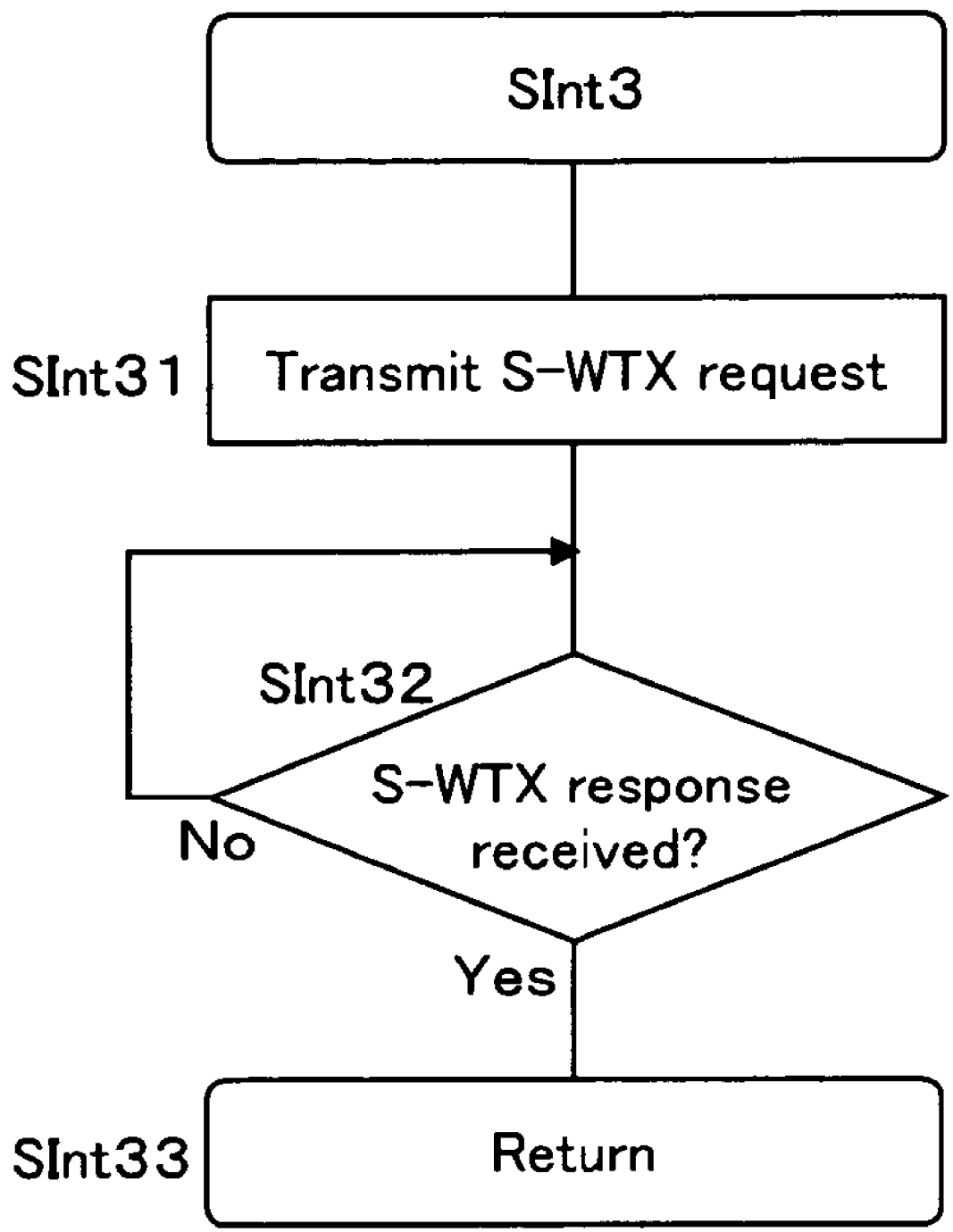
FIG. 10 is a flowchart showing a subroutine for an S-WTX request transmitting/receiving process (step SInt3) in the flowchart shown in FIG. 9.

In the interrupt process in step S8, as shown in FIG. 9, the non-contact type IC card 17 suspends the operation of the interval timer 4 in step SInt1. Next, in step SInt2, the non-contact type IC card 17 sets the data "1" in the operation clock control flag 1 and causes the operation clock control circuit 2 to suspend the supply of the operation clock 16 to the coprocessor 3. As a result, the operation of the coprocessor 3 is temporarily suspended. Next, in order to extend the frame waiting time for the reader/writer 14 in step SInt3, the non-contact type IC card 17 transmits the S-WTX request to the reader/writer 14 in step SInt31 as shown in FIG. 10. In step SInt32, the non-contact type IC card 17 waits for the transmission of the S-WTX response from the reader/writer 14. At the same time, the reader/writer 14 extends the time-out point of the frame waiting time. Upon receipt of the S-WTX response from the reader/writer 14, the non-contact type IC card 17 proceeds to step SInt4.

As shown in FIG. 9, in step SInt4, the non-contact type IC card 17 sets the data "0" in the operation clock control flag 1, and the operation clock control circuit 2 resumes the supply of the operation clock 16 to the coprocessor 3. As a result, the operation of the coprocessor 3 is resumed. Next, in step SInt5, the operation of the interval timer 4 is resumed thereby to end the interrupt process.

At the end of the interrupt process, the non-contact type IC card 17 again returns to step S82 (FIG. 8), and waits for the end of the arithmetic process of the coprocessor 3. At the end of the coprocessor arithmetic, the processor operation in step S8 is completed, and the non-contact type IC card 17 stops the operation of the interval timer 4 and prohibits the timer interrupt in step S9.

Once the entire execution of the command requiring the arithmetic process of the coprocessor 3 is completed, the non-contact type IC card 17 transmits the command execution result to the reader/writer 14 by I block in step S10. The process of step S10 is executed by branching to the data transmission process transferred to the RAM 11 in step S2.

Through the aforementioned control process, the non-contact type IC card 17 is controlled in such a manner that the operation of the coprocessor 3 and the communication between the reader/writer 14 and the non-contact type IC card 17 are prevented from being simultaneously carried out, and the coprocessor processing program is executed on the RAM 11 while prohibiting the access to the nonvolatile memory 12.

Others

The non-contact type IC card having a non-contact interface is explained in the embodiments above. As an alternative, the control process and the control means according to the present invention are also applicable to a contact type IC card having a contact interface with equal effect.

Figure 11:
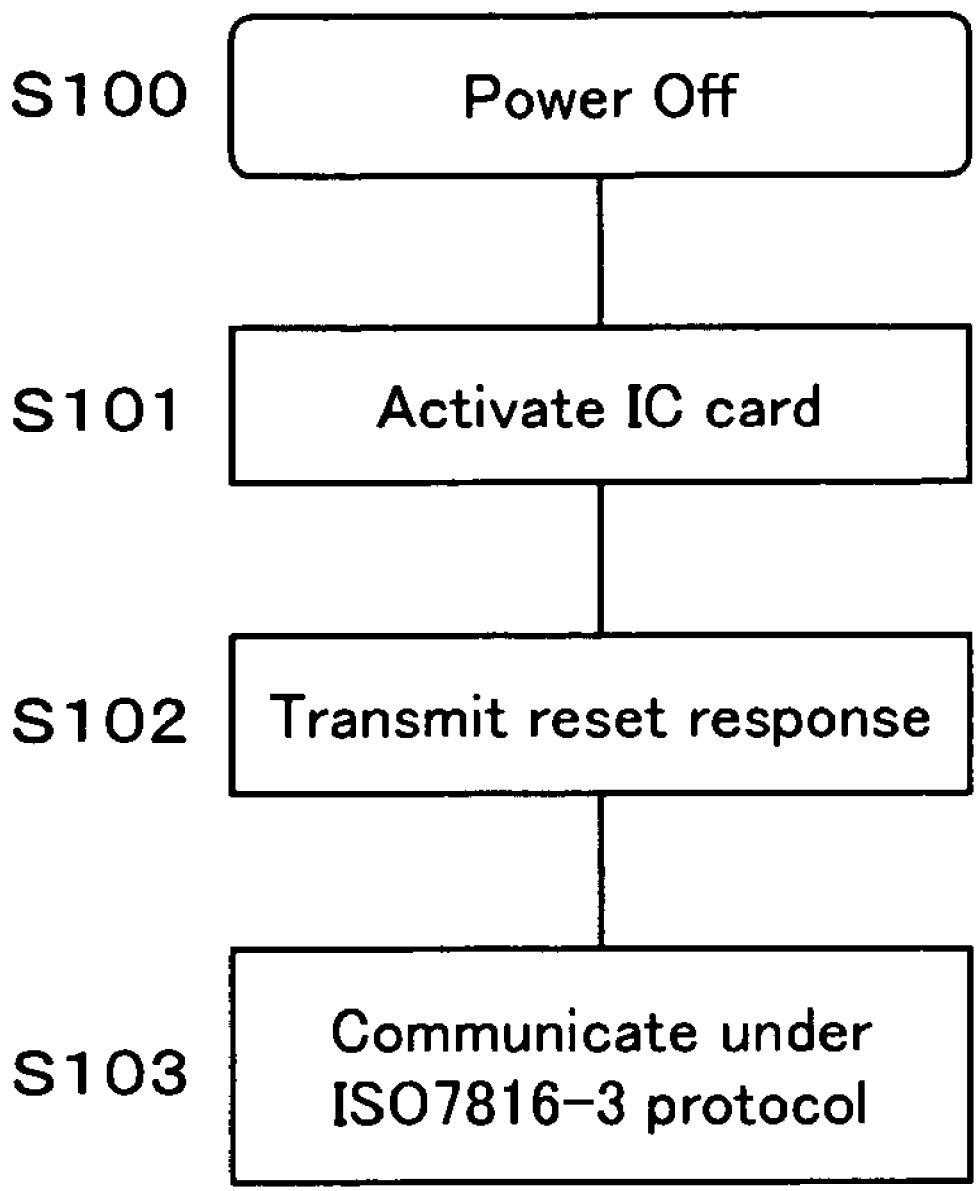
FIG. 11 is a flowchart showing an example of an initial response in a contact operation of a contact type IC card specified in ISO 7816-3.

In this case, the IC card operates according to the initial response process of the contact type IC card shown in FIG. 11 in the initial response routine in step S3 in the flowchart shown in FIG. 6. The contact type IC card is powered on by the IC card activating operation of the reader/writer (step S100). Then, the contact type IC supplies the clock and is reset (step S101). Next, the contact type IC card transmits the reset response to the reader/writer (step S102). After that, the communication is conducted between the reader/writer and the contact type IC card with the transmission protocol such as T=1 under ISO 7816-3 and the electrical signal for the IC card with an external terminal (step S103).

In the flowchart shown in FIG. 6, the operation at and subsequent to step S3 is similar to that of the non-contact type IC card having a non-contact interface.

Although the present invention has been described in terms of the preferred embodiments, it will be appreciated that various modifications and alterations might be made by those skilled in the art without departing from the spirit and scope of the present invention. The present invention should therefore be measured in terms of the claims which follow.

What is claimed is:

1. An integrated circuit (IC) card with a built in coprocessor for an auxiliary arithmetic in addition to a main arithmetic processing unit, comprising:
    an interval timer for outputting an interrupt request signal upon lapse of a set timer shorter than a frame waiting time; and
    coprocessor control means for controlling an operation of the coprocessor by suspending supply of an operation clock to the coprocessor in accordance with an output of the interrupt request signal, and resuming supply of the operation clock in accordance with a predetermined response input from an external device.

2. The IC card according to claim 1, further comprising:
    interval timer setting means for determining, upon receipt of a command from the external device, the contents of the command and setting a time shorter than the frame waiting time in the interval timer thereby to start the interval timer.

3. The IC card according to claim 2, comprising:
    a process of the interval time setting means is executed by the arithmetic processing unit.

4. The IC card according to claim 1 wherein
    the coprocessor control means includes:
    a control flag fro controlling a suspension and resumption of supply of an operation clock to the coprocessor;
    operation clock control means for controlling suspension and resumption of an operation clock to the coprocessor in accordance with state of the control flag; and
    control flag setting means for setting the control flag to suspension mode upon receipt of an output of the interrupt request signal and setting the control flag to resumption mode upon receipt of the response input.

5. The IC card according toclaim 4, wherein
    a process of the control flag setting means is executed by the arithmetic processing unit.

6. The IC card according to claim 5, wherein
    the arithmetic processing unit outputs a frame waiting time extension request to the external device upon suspension of supply of an operation clock to the coprocessor, and sets the control flag to resumption mode upon receipt of a response input from the external device.

7. The IC card according to claim 1, further comprising:
    a nonvolatile memory for storing a program for normal processing,
    and a second memory lower in power consumption than the nonvolatile memory, wherein
    a program executed by the coprocessor is stored in the second memory at least when the coprocessor is in operation.

8. The IC card according to claim 7, wherein
    an access to the nonvolatile memory is prohibited when the coprocessor is in operation.

9. The IC card according to claim 1, further comprising:
    at least any one of a non-contact interface and a contact interface for communication with the external device.

10. A control method of an integrated circuit (IC) card with a built-in coprocessor for an auxiliary operation in addition to a main arithmetic processing unit, comprising:
    setting an interrupt permission so as to output an interrupt request signal upon lapse of a set time shorter than a frame waiting time;
    starting an arithmetic operation of the coprocessor after setting the interrupt permission;
    branching the operation to an interrupt process in response to an output of the interrupt request signal during an arithmetic operation of the coprocessor; and
    suspending supply of an operation clock to the coprocessor in accordance with the output of the interrupt reciuest signal and resuming supply of the operation clock to the coprocessor upon receipt of a predetermined response input from an external device in the interrupt process.

11. The method according to claim 10, further comprising:
    determining upon receipt of a command from the external device, whether the command is an execution command of the coprocessor, and setting the interrupt permission when the command is an execution command of the coprocessor.

12. The method according to claim 10, further comprising:
    in the interrupt process, outputting a frame waiting time extension request to the external device after suspending supply of an operation clock to the coprocessor, and upon receipt of a response input from the external device, resuming supply of the operation clock.

* * * * *